United States Patent
Harada

(10) Patent No.: US 10,009,508 B2
(45) Date of Patent: Jun. 26, 2018

(54) IMAGE PROCESSING APPARATUS FOR READING CHECK BOXES

(71) Applicant: KYOCERA Document Solutions Inc., Osaka-shi, Osaka (JP)

(72) Inventor: Hiroyuki Harada, Osaka (JP)

(73) Assignee: KYOCERA Document Solutions Inc., Osaka-shi, Osaka (JP)

(*) Notice: Subject to any disclaimer, the term of this patent is extended or adjusted under 35 U.S.C. 154(b) by 0 days. days.

(21) Appl. No.: 15/472,118

(22) Filed: Mar. 28, 2017

(65) Prior Publication Data
US 2017/0289397 A1    Oct. 5, 2017

(30) Foreign Application Priority Data
Mar. 30, 2016  (JP) ................. 2016-068714

(51) Int. Cl.
| | |
|---|---|
| *H04N 1/393* | (2006.01) |
| *H04N 1/00* | (2006.01) |
| *H04N 1/32* | (2006.01) |
| *G09B 7/06* | (2006.01) |

(52) U.S. Cl.
CPC .......... *H04N 1/393* (2013.01); *G09B 7/06* (2013.01); *H04N 1/00803* (2013.01); *H04N 1/00816* (2013.01); *H04N 1/32133* (2013.01); *H04N 2201/0094* (2013.01)

(58) Field of Classification Search
CPC ....................................... H04N 1/393
USPC ....................................... 358/1.2
See application file for complete search history.

(56) References Cited

U.S. PATENT DOCUMENTS

| | | | |
|---|---|---|---|
| 2005/0024406 A1* | 2/2005 | Otsuki .......... | B41J 11/008 347/14 |
| 2007/0099168 A1* | 5/2007 | Nielsen .......... | G09B 7/02 434/353 |
| 2015/0064683 A1* | 3/2015 | Rajagopalan .......... | G09B 7/06 434/359 |

FOREIGN PATENT DOCUMENTS

JP        2011124832 A     6/2011

* cited by examiner

*Primary Examiner* — Jacky X Zheng
(74) *Attorney, Agent, or Firm* — Alleman Hall Creasman & Tuttle LLP

(57) ABSTRACT

An image processing apparatus includes an image reading portion, a position detection portion, and a print processing portion. The image reading portion is configured to read an image of a document. The position detection portion is configured to detect position information of each of check boxes included in a read image by the image reading portion. The print processing portion is configured to be able to print a position specifying image indicating the position information of each of check boxes detected by the position detection portion.

10 Claims, 7 Drawing Sheets

Q1  AAAAAAAAAAAAAAAAAAAAAA

☐ BBBB   ☐ BBBB   ☐ BBBB   ☐ BBBB
CK1      CK1      CK1      CK1

Q2  BBBBBBBBBBBBBBBBBBBB

☐ BBBB   ☐ BBBB   ☐ BBBB   ☐ BBBB
CK1      CK1      CK1      CK1

Q3  CCCCCCCCCCCCCCCCCCCC

☐ BBBB   ☐ BBBB   ☐ BBBB   ☐ BBBB
CK1      CK1      CK1      CK1

Q4  DDDDDDDDDDDDDDDDDDDD

☐ BBBB   ☐ BBBB   ☐ BBBB   ☐ BBBB
CK1      CK1      CK1      CK1

Q5  EEEEEEEEEEEEEEEEEEEE

☐ BBBB   ☐ BBBB   ☐ BBBB   ☐ BBBB
CK1      CK1      CK1      CK1

Q6  FFFFFFFFFFFFFFFFFFFF

☐ BBBB   ☐ BBBB   ☐ BBBB   ☐ BBBB
CK1      CK1      CK1      CK1

Q7  GGGGGGGGGGGGGGGGGGGG

☐ BBBB   ☐ BBBB   ☐ BBBB   ☐ BBBB
CK1      CK1      CK1      CK1

Q8  HHHHHHHHHHHHHHHHHHHH

☐ BBBB   ☐ BBBB   ☐ BBBB   ☐ BBBB
CK1      CK1      CK1      CK1

IMAGE PROCESSING APPARATUS FOR READING CHECK BOXES

INCORPORATION BY REFERENCE

This application is based upon and claims the benefit of priority from the corresponding Japanese Patent Application No. 2016-068714 filed on Mar. 30, 2016, the entire contents of which are incorporated herein by reference.

BACKGROUND

The present disclosure relates to an image processing apparatus that is capable of performing an operation such as creating bubble sheets, or automatically recognizing writing results of bubble sheets.

There is known a document management system that generates and prints a cover page on which a QR code (registered trademark) is associated, in a reduced image of a document sheet on the top page of a document, with storage destination information of image data of the document is provided, and that reads print data of the document from the storage destination corresponding to the QR code when the cover page is scanned.

In an examination, a questionnaire, or the like, bubble sheets each including check boxes may be used. There is known an image processing apparatus that is capable of creating and printing bubble sheets, and automatically recognizing a written result of each of check boxes on the basis of image data read from each written bubble sheet. In this type of image processing apparatus, since position information of each of check boxes is already known when the bubble sheet is created, it is possible to recognize the written result of each of check boxes on the basis of the position information.

SUMMARY

An image processing apparatus according to one aspect of the present disclosure includes an image reading portion, a position detection portion, and a print processing portion. The image reading portion is configured to read an image of a document. The position detection portion is configured to detect position information of each of check boxes included in a read image by the image reading portion. The print processing portion is configured to be able to print a position specifying image indicating the position information of each of check boxes detected by the position detection portion.

An image processing apparatus according to another aspect of the present disclosure includes an image reading portion, a position specification processing portion, and a written result acquisition portion. The image reading portion is configured to read an image from a document. The position specification processing portion is configured to specify, when a preset position specifying image indicating position information of each of check boxes is included in the read image read by the image reading portion, the position information of each of check boxes in the read image from the position specifying image. The written result acquisition portion is configured to acquire a written result of each of check boxes from the read image on the basis of the position information specified by the position specification processing portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 is an external view of a bubble sheet on which a position specifying image, generated in the image processing apparatus according to the embodiment of the present disclosure, is to be printed.

DETAILED DESCRIPTION

Hereinafter, embodiments of the present disclosure will be described with reference to the drawings. It should be noted that the embodiments described below are each an example embodying the present disclosure and do not limit the technical scope of the present disclosure.

[First Embodiment]

Figure 1:
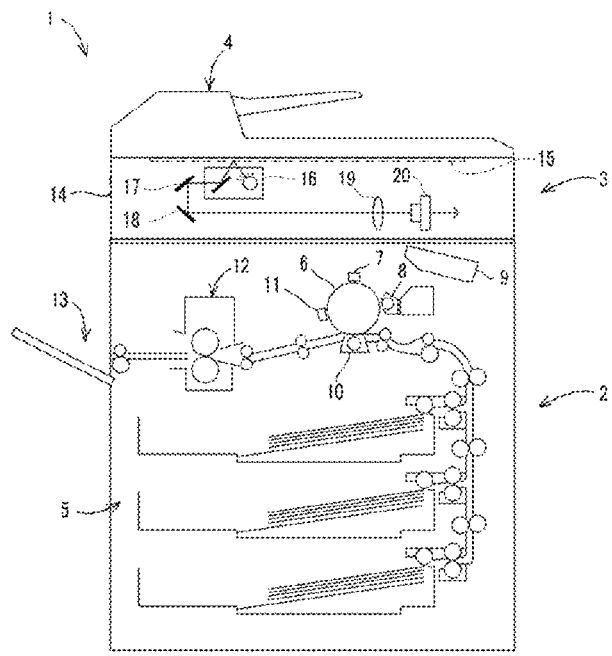
FIG. 1 is a diagram showing a configuration of an image processing apparatus according to an embodiment of the present disclosure.
Figure 2:
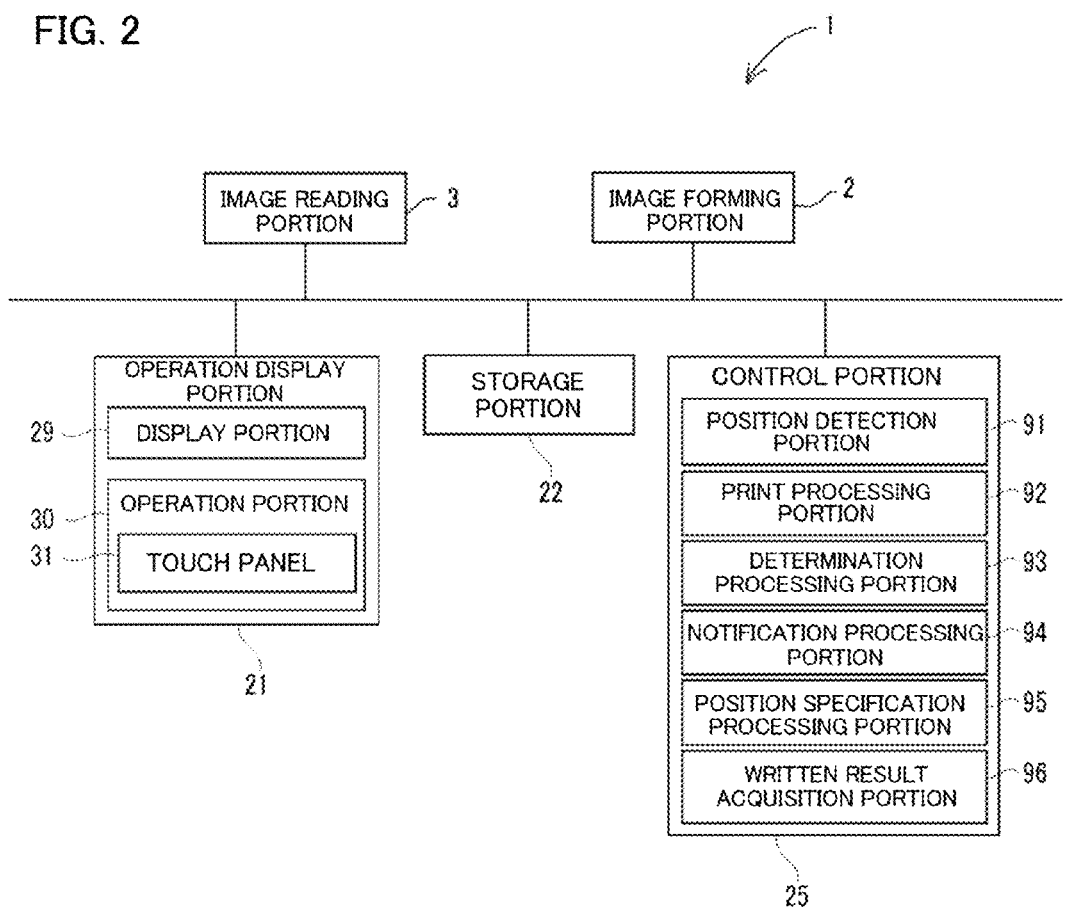
FIG. 2 is a block diagram showing the configuration of the image processing apparatus according to the embodiment of the present disclosure.

As shown in FIG. 1, an image processing apparatus 1 according to an embodiment of the present disclosure is a multifunction peripheral having functions such as a scan function, a print function, and a facsimile function. As shown in FIGS. 1 and 2, the image processing apparatus 1 includes an image forming portion 2, an image reading portion 3, an operation display portion 21, a storage portion 22, and a control portion 25.

The image forming portion 2 includes a sheet feed portion 5, a photosensitive drum 6, a charging portion 7, a development portion 8, an exposure portion 9, a transfer portion 10, a cleaning portion 11, a fixing portion 12, and a sheet discharge portion 13, and forms an image on a sheet by electrophotography.

The image reading portion 3 executes an image reading operation of reading an image of a document. The image reading portion 3 includes a housing 14, a contact glass 15, a lighting device 16, mirrors 17 and 18, an optical lens 19, an imaging device 20, and an automatic document feeder 4 (hereinafter, referred to as "ADF 4").

The image reading portion 3 is capable of reading an image of a document placed on the contact glass 15 or an image of a document set in the ADF 4. Specifically, the image reading portion 3, when reading the image from the document placed on the contact glass 15, sequentially radiates light for one line while moving the lighting device 16 in the left-right direction of FIG. 1. The image reading portion 3, when reading the image from the document set in the ADF 4, radiates light for one line using the lighting device 16 while automatically conveying the document. The image reading portion 3 receives, by the imaging device 20, light reflected from the document via the mirrors 17 and 18, and the optical lens 19, and sequentially outputs, to the control portion 25, an image signal corresponding to an amount of the light received by the imaging device 20 as image data.

The operation display portion 21 includes a display portion 29 and an operation portion 30. The display portion 29, for example, includes a color liquid crystal display, and displays various kinds of information for a user who operates the operation display portion 21. The operation portion 30 includes various types of push button keys (not shown) disposed adjacent to the display portion 29, and a touch panel 31 disposed on a display screen of the display portion 29. When an operation is executed by the user for an instruction to execute each of various processes such as an image reading process, the operation display portion 21 outputs, to the control portion 25, an operation signal corresponding to the operation.

The storage portion 22 is a non-volatile memory such as EEPROM (registered trademark: Electrically Erasable Programmable Read-Only Memory), a hard disk, or the like. In the storage portion 22, image data of a reference image and representing the shape for each of one or more types of preset check boxes (for example, refer to a check box CK1 of FIG. 5), size information of each of check boxes, and the like, are stored in advance. In the present embodiment, the case where the shape of the check box is rectangular will be described. However, the check box may have another shape such as an elliptical shape.

The control portion 25 is a microcomputer that includes a CPU, a ROM, a RAM, and the like. In the ROM of the control portion 25, a control program for causing the CPU of the control portion 25 to execute various types of processes is stored, and the control portion 25 centrally controls the image processing apparatus 1.

Incidentally, there is known an image processing apparatus that is capable of creating and printing bubble sheets, and recognizing a written result of each of check boxes on the basis of image data read from each written bubble sheet. In this type of image processing apparatus, it is not possible to recognize the written result of each of check boxes from image data of the bubble sheet in which the position of each of check boxes is not already known. The written result of each of check boxes may be recognized by, for example, extracting a difference image between the image data of the unwritten bubble sheet and the image data of the written bubble sheet. In this case, however, an extraction process of extracting the difference image of the whole bubble sheet for each bubble sheet needs to be executed, and therefore processing load is large and processing time is long. Since in the extraction process of the difference image, stains included in the bubble sheet, additional written positions, or the like except the check boxes are extracted as a difference image, it is difficult to recognize only the written result of each of check boxes with high accuracy. On the other hand, the image processing apparatus 1 according to the present embodiment is capable of creating, from an unspecified bubble sheet, a bubble sheet from which position information of each of check boxes can be easily acquired, and is capable of easily acquiring the written result of each of check boxes from the read image of the bubble sheet.

Specifically, the control portion 25 includes a position detection portion 91, a print processing portion 92, a determination processing portion 93, a notification processing portion 94, a position specification processing portion 95, and a written result acquisition portion 96. The control portion 25 functions as the respective processing portions by executing various types of processes in accordance with the control program by the CPU. A configuration in which one or more of the functions of the control portion 25 are implemented as electronic circuits is conceivable as another embodiment.

The position detection portion 91 is capable of detecting position information of each of check boxes included in the read image read by the image reading portion 3. Specifically, the position detection portion 91 detects, from the document including the check boxes (for example, refer to a document MS1 of FIG. 5), the position information of each of the check boxes, regarding the read image read by the image reading portion 3.

Figure 7:
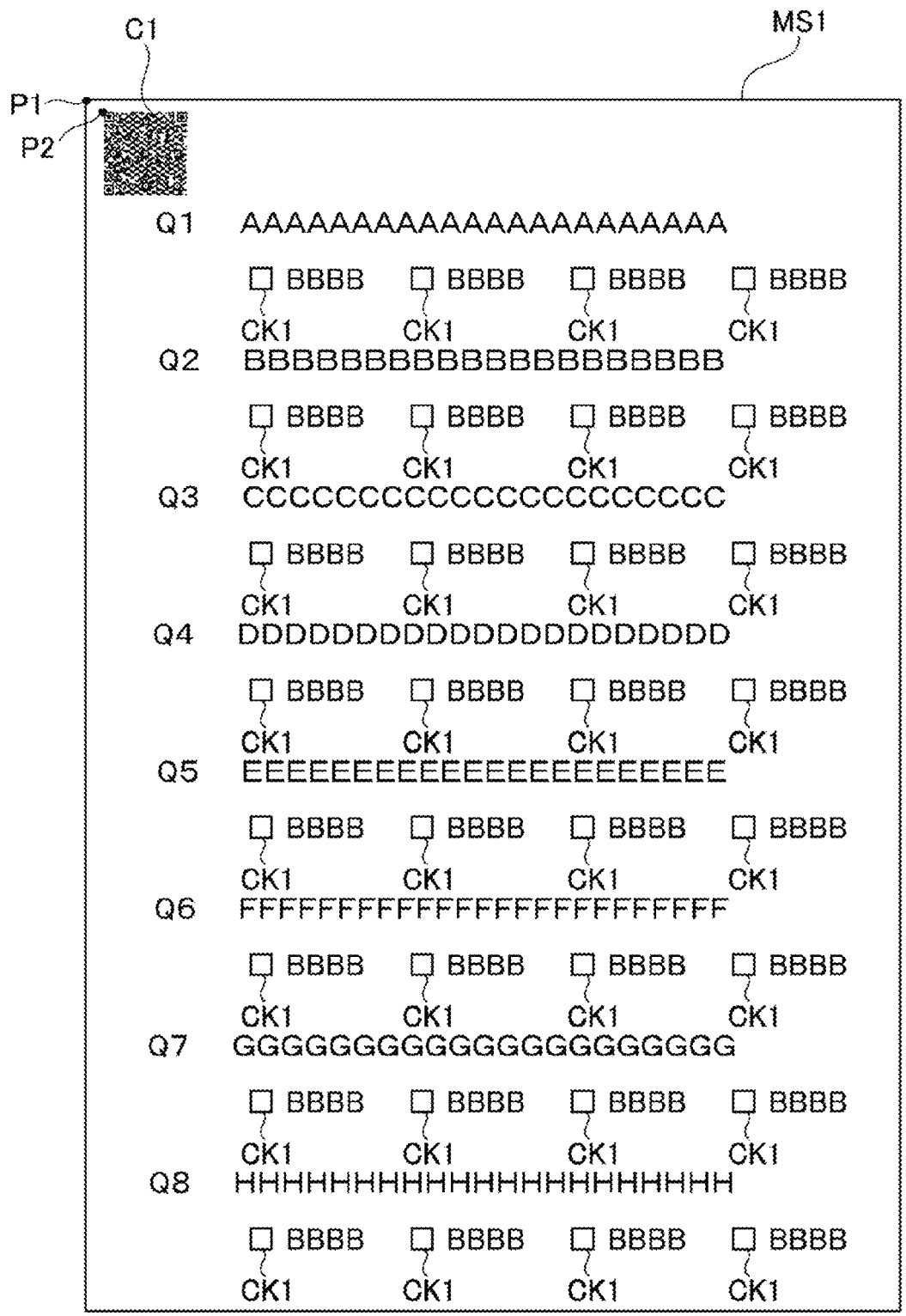
FIG. 7 is an external view of the bubble sheet on which the position specifying image, generated in the image processing apparatus according to the embodiment of the present disclosure, has been printed.
Figure 8:
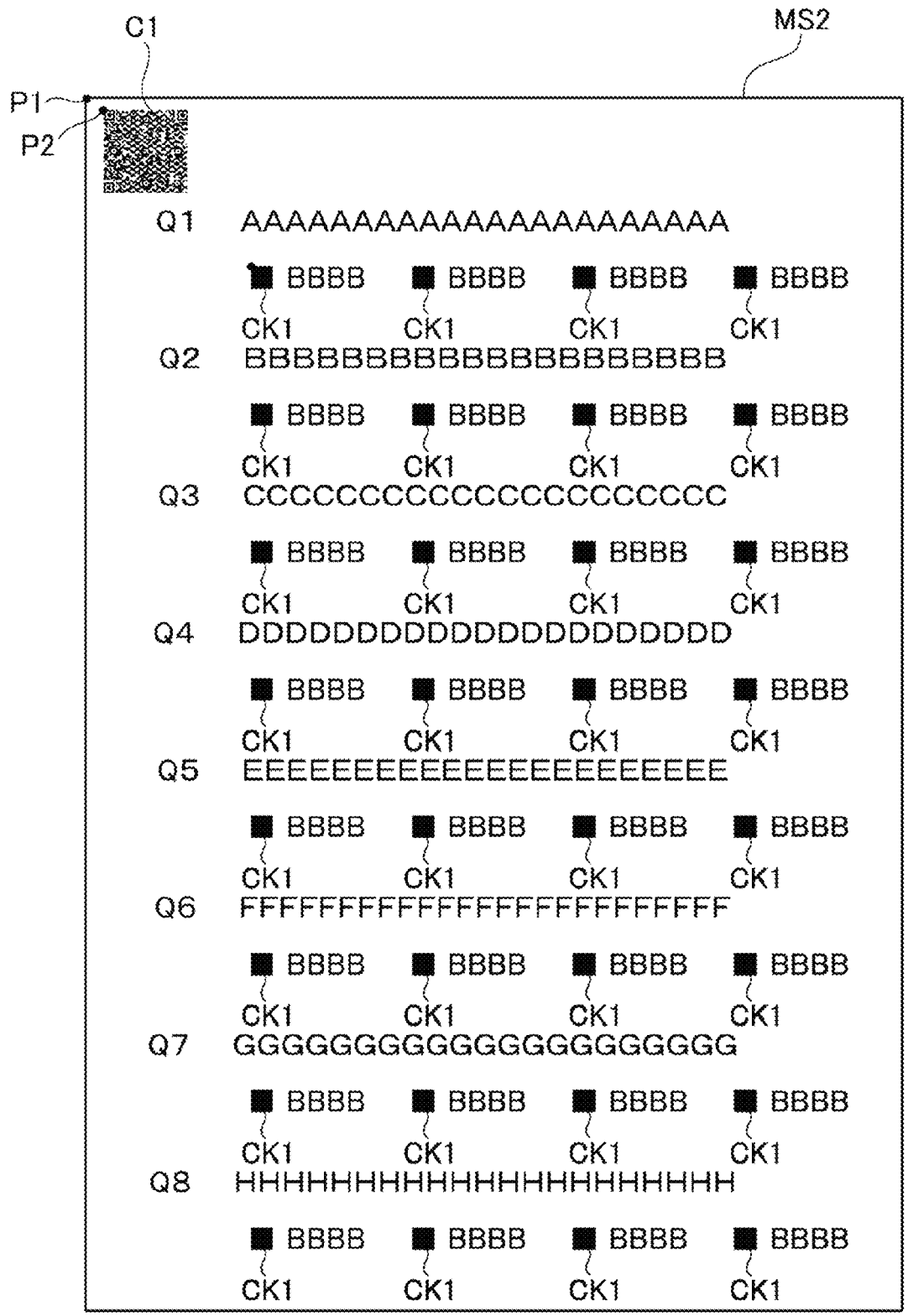
FIG. 8 is an external view of the bubble sheet on which all check boxes, generated in the image processing apparatus according to the embodiment of the present disclosure, have been checked.

The print processing portion 92 is capable of printing a position specifying image indicating the position information of each of check boxes detected by the position detection portion 91 (for example, refer to a position specifying image C1 of FIG. 7 or FIG. 8). Specifically, in the present embodiment, the case where the position specifying image is a QR code (registered trademark) will be described. The position specifying image may be another two-dimensional code or a one-dimensional barcode.

The determination processing portion 93 is capable of determining, when the position specifying image is to be superimposed and printed on the read image read by the image reading portion 3, whether or not a print target area on which the position specifying image is to be printed is blank.

The notification processing portion 94 is capable of sending a notification, when the position specifying image is printed on the document from which the read image is read by the image reading portion 3, that the document should be set in the sheet feed portion 5.

The position specification processing portion 95 is capable of specifying the position information of each of check boxes in the read image from the position specifying image included in the read image read by the image reading portion 3.

The written result acquisition portion 96 is capable of acquiring the written result of each of check boxes from the read image on the basis of the position information of each of check boxes specified by the position specification processing portion 95. Specifically, the written result acquisition portion 96 acquires, as the written result, whether or not each of check boxes has been checked or whether or not each of check boxes has been filled.

Figure 3:
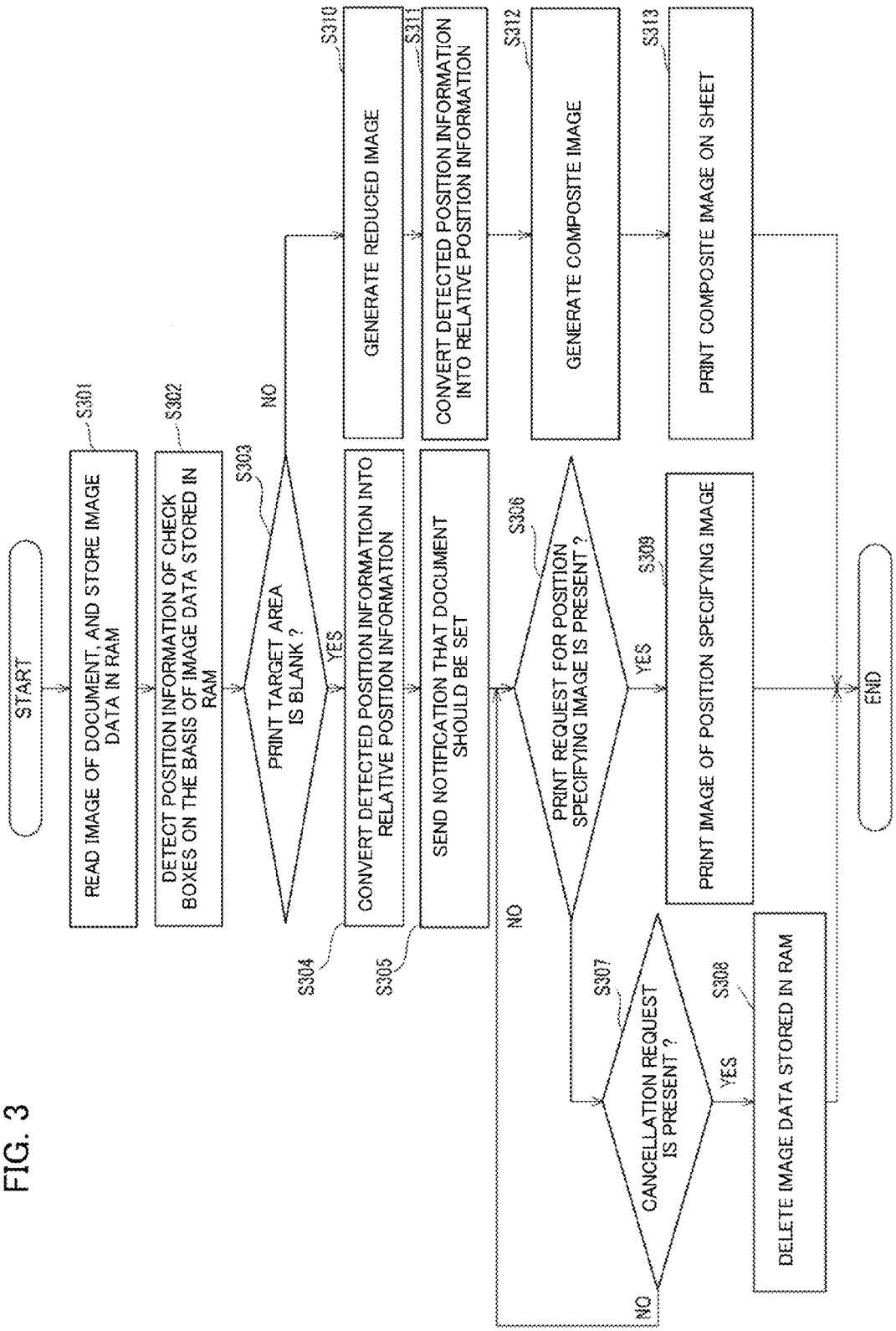
FIG. 3 is a flowchart showing a code formation process executed by a control portion in the image processing apparatus according to the embodiment of the present disclosure.

Next, with reference to FIG. 3, an example of a code formation process executed by the control portion 25 will be described. In the flowchart of FIG. 3, S301, S302, . . . each represent a process procedure (step number). The process of the flowchart of FIG. 3 is executed by the control portion 25 when the mode of executing the code formation process has been selected using the operation portion 30 and then initiation of the image reading operation has been requested.

<Step S301>

In step S301, the control portion 25 causes the image reading portion 3 to execute the image reading operation of reading an image from the document set on the contact glass 15 or in the ADF 4, thus acquiring image data corresponding to the document, and stores the image data in the RAM. Hereinafter, the case where the bubble sheet, as shown in FIG. 5, is placed on the contact glass 15 as the document MS1, and the image is read from the document MS1 by the image reading operation, will be described by means of a specific example.

<Step S302>

In step S302, the control portion 25 detects, on the basis of the image data stored in the RAM in step S301, the position information of each of check boxes printed on the document. The position information is coordinate information of each of check boxes in the read image, and is, for example, coordinate information of the upper left end of each of check boxes. This coordinate information is coordinate information on the basis of a point P1 located at the upper left end of the document (refer to FIG. 6). This process is executed by the position detection portion 91 of the control portion 25. The control portion 25 generates the position specifying image indicating the position information of each of check boxes, and stores the image data of the position specifying image in the storage portion 22. The number of position specifying images is not limited to one, and the position information of each of check boxes may be shown by the position specifying images.

In another embodiment, the control portion 25 may execute printout, for example, of a printed matter in which all check boxes have been checked or filled (for example, refer to a printed matter MS2 of FIG. 8), which is called proof, in step S302. Thereby, the user is allowed to check, by referring to the printed matter, whether or not a detection result of the position information of each of check boxes is appropriate.

<Step S303>

In step S303, the control portion 25 determines whether or not a predetermined print target area in the read image (for example, refer to a print target area H2 of FIG. 6) is blank. In the present embodiment, the print target area is a rectangular area included in a preset header area (for example, see a header area H1 of FIG. 6). When the control portion 25 determines that the print target area is blank (YES in step S303), the control portion 25 advances the process to step S304. On the other hand, when the control portion 25 determines that the print target area is not blank (NO in step S303), the control portion 25 advances the process to step S310. This process is executed by the determination processing portion 93 of the control portion 25. The print target area is not limited to the header area. The printed target area may be a preset area at the inner side of the header area in the read image, or a preset area, in the read image, extending across and outside of the header area.

<Step S304>

Figure 6:
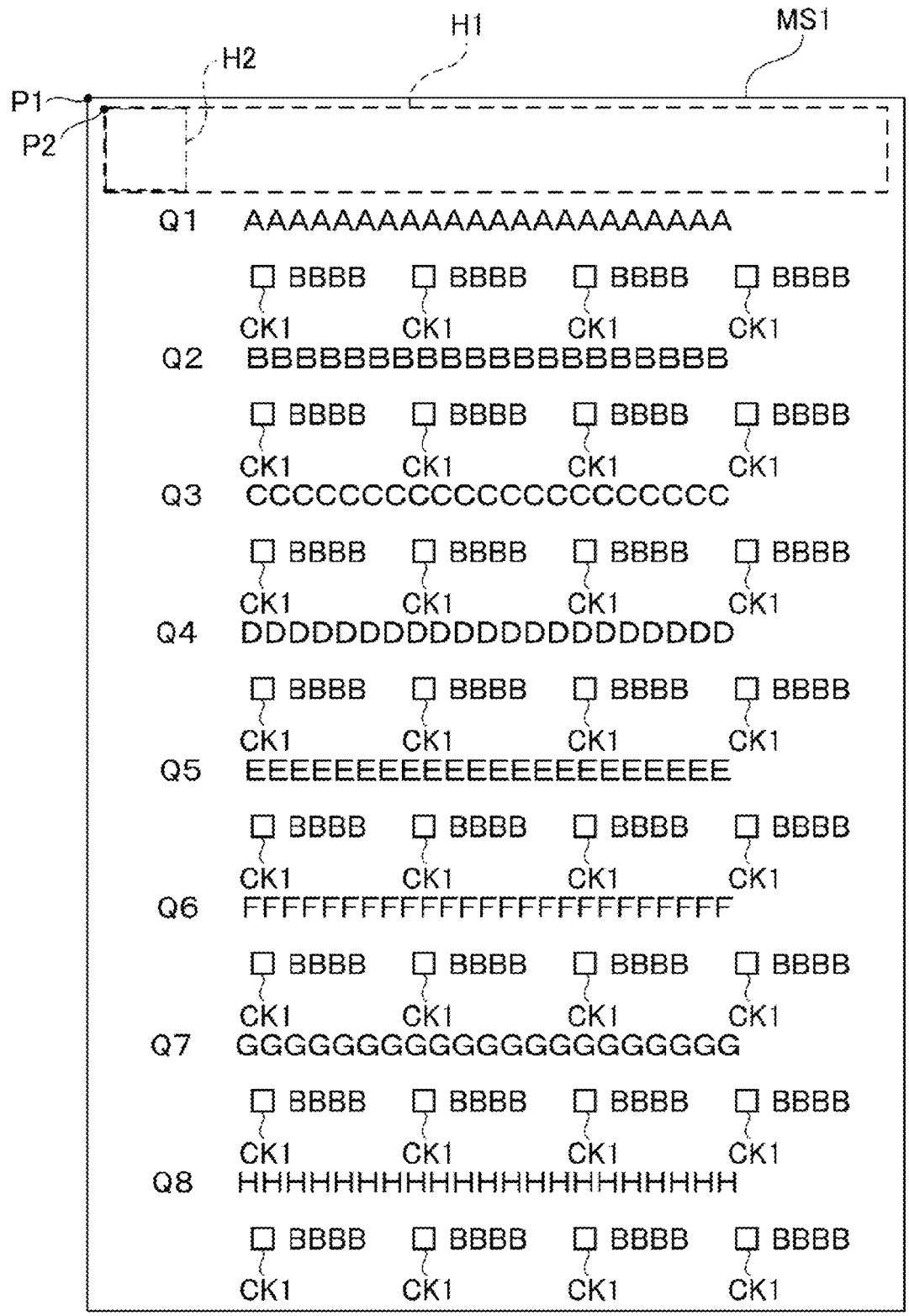
FIG. 6 is an explanation diagram showing a process of step S304 of the flowchart as shown in FIG. 3.

In step S304, the control portion 25 converts the position information detected in step S302 into relative position information indicating a relative position between each of check boxes and the print position of the position specifying image. In the example of FIG. 6, the position information of each of check boxes, detected on the basis of the point P1 located at the upper left end of the read image, is converted into the relative position information indicating the relative position of each of check boxes with respect to, for example, a reference position farthest from the check box in the position specifying image (for example, P2 of FIG. 6). For example, the relative position information is coordinate information in which the reference position in the position specifying image is set as the origin. This process is executed by the detection processing portion 91 of the control portion 25. The coordinate information of each of check boxes detected in step S302 may be coordinate information on the basis of the reference position. In this case, step S304 is omitted.

<Step S305>

In step S305, the control portion 25 notifies, by displaying a preset message on the display portion 29, that the document that is a reading target in step S301 should be set in the sheet feed portion 5. This process is executed by the notification processing portion 94 of the control portion 25. Thus, the user sets the document MS1 in the sheet feed portion 5, so that the image processing apparatus 1 becomes capable of executing overlay printing by overlaying the position specifying image on the document MS1 that is an original document from which the read image is read. This notification process in step S305 needs not necessarily to be executed.

<Step S306>

In step S306, the control portion 25 determines whether or not a print request has been executed for the position specifying image. For example, the control portion 25 determines that the print request has been executed when an operation input for executing the print has been executed using the operation portion 30. When the control portion 25 determines that the print request has not been executed (NO in step S306), the control portion 25 advances the process to step S307. On the other hand, when the control portion 25 determines that the print request has been executed (YES in step S306), the control portion 25 advances the process to step S309.

<Step S307>

In step S307, the control portion 25 determines whether or not a cancellation request has been executed for the code formation process. For example, the control portion 25 determines that the cancellation request has been executed when an operation input for cancelling the code formation process has been executed using the operation portion 30. When the control portion 25 determines that the cancellation request has not been executed (NO in step S307), the control portion 25 returns the process to step S306. On the other hand, when the control portion 25 determines that the cancellation request has been executed (YES in step S307), the control portion 25 shifts the process to step S308.

<Step S308>

In step S308, the control portion 25 deletes, from the RAM, the image data stored in the RAM in step S301, and ends the code formation process.

<Step S309>

On the other hand, in step S309, the control portion 25 causes the image forming portion 2 to execute a print operation of printing the position specifying image indicating the relative position information of each of check boxes generated in step S304, on the print target area in the document set in the sheet feed portion 5. This process is executed by the print processing portion 92 of the control portion 25. FIG. 7 is a diagram showing an example of the document MS1 generated by overlay printing in which the position specifying image C1 has been overlaid on the print target area 112.

In the present embodiment, in step S309, overlay printing is executed by overlaying only the position specifying image on the document. However, in another embodiment, a composite image of the read image read in step S301 and the position specifying image may be generated and printed on the document.

<Step S310>

When the print target area is not blank (NO in step S303), the control portion 25 generates, in the following step S310, a reduced image acquired by reducing the read image read in step S301. The control portion 25 may reduce the read image at a reduction rate that is the same between that in the vertical direction and that in the horizontal direction, or may reduce the read image only in the vertical direction. In the present embodiment in which the print target area is provided in the header area H1, the reduction rate is set, at least, to a maximum value (the smallest value in reduction degree) of the reduction rates at which the print target area that is blank is secured. Thus, the difficulty is reduced for a writer to write in the check box due to a reduction in the size of the check box. However, in another embodiment, the reduction rate may be set to another value.

<Step S311>

In step S311, the control portion 25 converts the position information detected in step S302 on the basis of the reduction rate. This is because the position information of the check box detected in step S302 is changed due to a change of the size of the read image by the process of step S310. The control portion 25 converts, as in the process of step S304, the converted position information into the relative position information indicating the relative position between each of check boxes and the print position of the position specifying image. This process is executed by the detection processing portion 91 of the control portion 25.

<Step S312>

In step S312, the control portion 25 generates the position specifying image indicating the position information of each of check boxes after the conversion in step S311, and generates a composite image acquired by combining the position specifying image and the reduced image.

<Step S313>

In step S313, the control portion 25 causes the image forming portion 2 to execute a process of printing the composite image, generated in step S312, on a sheet set in the sheet feed portion 5. That is, the control portion 25 is capable of printing the read image and the position specifying image. This process is executed by the print processing portion 92 of the control portion 25.

The control portion 25 automatically executes the processes of step S310 to step S313. In another embodiment, the user may be allowed to determine whether or not to execute these processes, and the processes may be executed if the user permits. When the print target area is not blank (NO in step S303), the control portion 25 may execute, without executing step S310 to step S313, a process of notifying, using the display portion 29 or the like, that the position specifying image document cannot be formed on the document.

The document on which the position specifying image has been printed in step S309 or step S313 can be a document to be copied by the image forming apparatus 1. That is, when this document is placed on contact glass 15 or set in the ADF 4 and a copy instruction is provided to the operation portion 30, the image of the document is read by the image reading portion 3, and then the image is printed by the print processing portion 92.

Figure 4:
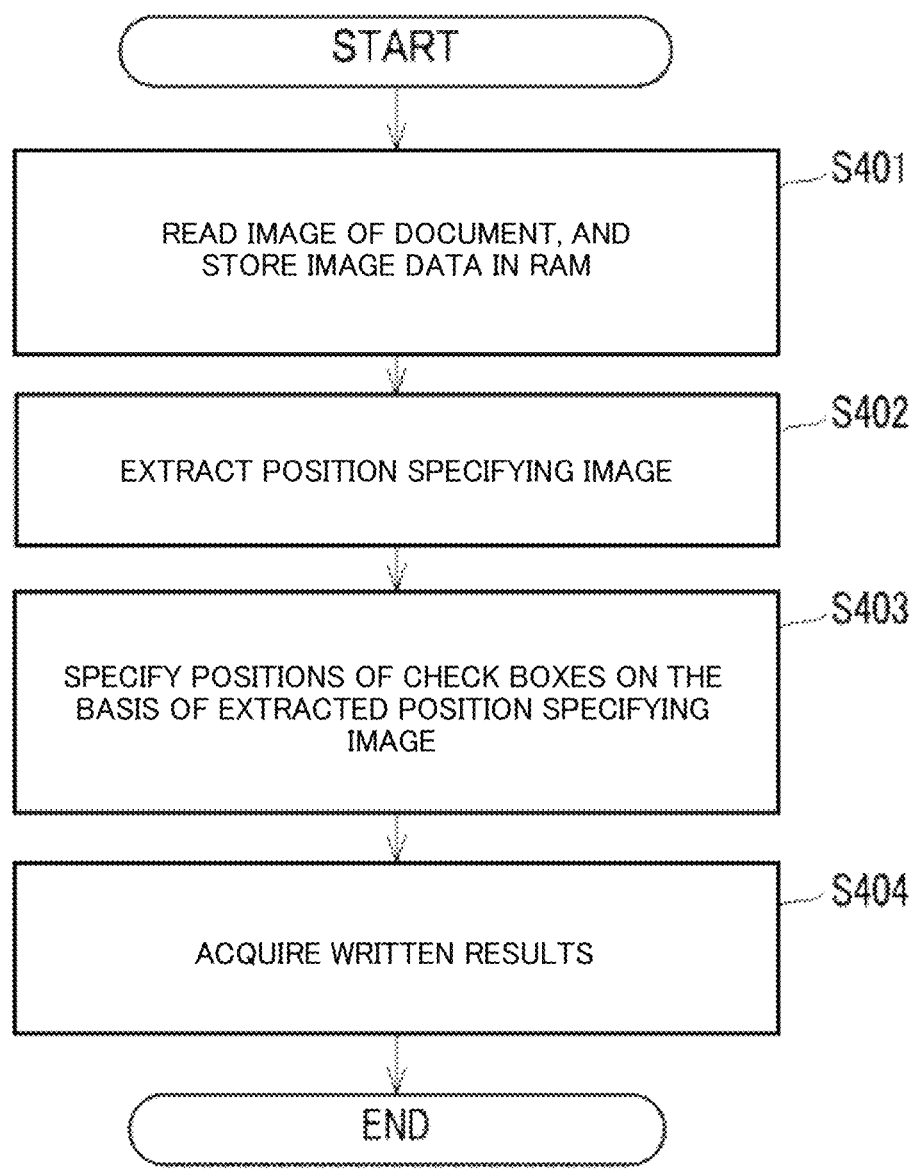
FIG. 4 is a flowchart showing a written result detection process executed by the control portion in the image processing apparatus according to the embodiment of the present disclosure.

Next, with reference to FIG. 4, an example of a written result detection process executed by the control portion 25 will be described. In the flowchart of FIG. 4, steps S401, S402, . . . each represent a process procedure (step number). The process of the flowchart as shown in FIG. 4 is started to be executed by the control portion 25 when the mode of executing the written result detection process is selected using the operation portion 30 and then initiation of the image reading operation is requested.

<Step S401>

In step S401, the control portion 25 causes the image reading portion 3 to execute the image reading operation of reading the image of the document, thus acquiring image data corresponding to the document, and stores the image data in the RAM.

<Step S402>

In step S402, the control portion 25 executes the extraction process of extracting the position specifying image from the read image indicated by the image data stored in step S401 in the RAM.

<Step S403>

In step S403, the control portion 25 specifies the position of each of check boxes on the basis of the position specifying image extracted in step S402. This process is executed by the position specification processing portion 95 of the control portion 25. Even if the document is placed on the contact glass 15 with the position being displaced in parallel with at least one direction of the horizontal direction and the vertical direction, the relative position of each of check boxes is unchanged with respect to the position in which the position specifying image is formed. Thus, it is possible to accurately detect the position of each of check boxes.

<Step S404>

In step S404, the control portion 25 detects the written state of each of check boxes on the basis of the position information of each of check boxes specified in step S403. Specifically, the control portion 25 may acquire written result information of each of check boxes on the basis of the difference between the image data of the position specified, in step S403, as the position of each of check boxes and the image data of the reference image of each of check boxes stored in the storage portion 22.

Of bubble sheets, there is a bubble sheet in which options for an answer or inquiry (hereinafter, only referred to as an answer) corresponding to each question or problem (hereinafter, only referred to as a question) are provided and a check box is provided to each of the options. In this bubble sheet, check boxes corresponding to one question may be provided in a row or a column. On the other hand, the control portion 25 is capable of collecting the written results by regarding, as a single unit, a group of the check boxes arranged in the horizontal row or the vertical column. Specifically, the control portion 25 accepts a user operation executed on the operation portion 30 for specifying the unit of the group of check boxes, and divides, into blocks of each group of check boxes, the area in which the check boxes are provided. In step S404, the control portion 25 may acquire the written result information of each block unit, and may determine, on the basis of the written result information of each block, whether the answer to each question is correct, for example. This process is executed by the written result acquisition portion 96 of the control portion 25.

In the code formation process, the control portion 25 may record, in the position specifying image, setting information such as the unit of the group of check boxes or the range of each block. For example, the control portion 25 specifies the unit of the group of check boxes on the basis of acceptance of the user operation executed on the operation portion 30 or a preset block condition, and records the setting information in the position specifying image. Thus, when the document on which the position specifying image has been recorded is read, the control portion 25 is capable of, in the step S404, specifying the unit of the group of check boxes, the range of each block, or the like on the basis of the setting information.

As described above, the image processing apparatus 1 is capable of detecting the position information of each block included in the read image read by the image reading portion 3, and printing, on the document, the position specifying image indicating the position information of each of check boxes. That is, the image processing apparatus 1 is capable of creating, from an unspecified document, a document from which the position information of each of check boxes can be easily acquired. The image processing apparatus 1 is capable of specifying the position information of each of check boxes from the position specifying image included in the read image read by the image reading portion 3, and acquiring the written result of each of check boxes from the read image on the basis of this position information. That is, the image processing apparatus 1 is capable of easily acquiring the written result of each of check boxes from the read image of the document.

The image processing apparatus 1 may not be able to accurately specify the position of each of check boxes when the image processing apparatus 1 reads the document on which the position specifying image has been printed by another image processing apparatus.

That is, there is a case where the document that is a reading target is a document which includes the position specifying image printed in the code formation process by the other image processing apparatus. There may be a difference in optical characteristic between the image reading portion 3 of the image processing apparatus 1 and an image reading portion of the other image processing apparatus. There may be a difference in document conveying speed by the ADF 4 between the image reading portion 3 of the image processing apparatus 1 and the image reading portion of the other image processing apparatus. Thus, when the optical characteristic or the conveying speed of the image reading portion is different for each image processing apparatus, the read image may be an image acquired by slightly enlarging or reducing the image of the document even if the image of the document is read at the same reading resolution. In this case, an error occurs between the relative position information and the actual position information of each of check boxes with respect to the reference position in the read image.

On the other hand, the control portion 25 (position specification processing portion 95) may have a function to correct the relative position information in the written result detection process.

Specifically, the control portion 25 specifies the relative position with respect to the reference position of a preset specific check box from the position specifying image included in the read image. However, the specified position may include the error. Therefore, the control portion 25 executes a process of searching a preset range for the specific check box by setting, as a search range, a preset range having a center at the specified position. The control portion 25 specifies an accurate relative position of the specific check box with respect to the reference position.

Next, the control portion 25 calculates respective differences $Rx1$, $Ry1$, for example, in the X-axis direction that is the horizontal direction of FIG. 5 and the Y-axis direction that is the vertical direction of FIG. 5, each between the position of the specific check box and the reference position in the read image. The control portion 25 calculates differences $Dx1$, $Dy1$ each between the position of the specific check box and the reference position shown by the relative position information. The control portion 25 calculates, as correction coefficients, a ratio $Rx1/Dx1$ between the difference $Rx1$ and the difference $Dx1$ and a ratio $Ry1/Dy1$ between the difference $Ry1$ and the difference $Dy1$. The control portion 25 corrects the difference, for example, in the Y-axis direction, of the position of each of the other check boxes except the specific check box, using the correction coefficient $Ry1/Dy1$. That is, the control portion 25 multiplies the coordinate information of each of the other check boxes by the correction coefficient $Ry1/Dy1$. For example, when the control portion 25 detects that the difference $Ry1$ is 1.1 times the difference $Dy1$, that is, that the correction coefficient is 1.1, the control portion 25 multiplies the coordinate information of each of the other check boxes by 1.1. This correction processing is executed by the position specification processing portion 95.

As described above, the position specification processing portion 95 detects a relative relationship between the preset specific check box of the check boxes and the print position of the position specifying image in the read image. The position specification processing portion 95 corrects the position information on the basis of the relative relationship, and specifies the position information of each of check boxes on the basis of the corrected position information. By executing the correction process, the image processing apparatus 1 is capable of accurately detecting the position of each of check boxes even if the document that is the reading target is a document on which the position specifying image has been printed by the other image processing apparatus.

However, the relative position of the specific check box with respect to the reference position is specified with, as a smallest unit, a pixel corresponding to the reading resolution of the image reading portion. Therefore, when there is an error between the difference $Ry1$ and the difference $Dy1$, an error amount having a length of an integer multiple of one pixel, of the error, is directly reflected in the difference $Ry1$. However, when an error amount having a length shorter than the length of one pixel is included, the error amount is reflected as one pixel in the difference $Ry1$. In this case, the error is included in the correction coefficient $Ry1/Dy1$. When the error is included in the correction coefficient $Ry1/Dy1$, the error may be included also in a value acquired by correcting, using the correction coefficient $Ry1/Dy1$, the difference between the positions of the adjacent two check boxes.

It is possible to divide the difference $Ry1$ into one pixel due to the error amount having a length shorter than the length of one pixel and the other $(Ry1-1)$ pixels, and express the correction coefficient $Ry1/Dy1$ by the expression of $1/Dy1+(Ry1-1)/Dy1$. According to this expression, when the error amount having a length shorter than the length of one pixel is reflected as one pixel in the difference $Ry1$, the smaller $1/Dy1$ in the first term of the expression is, that is, the smaller the proportion of one pixel to the difference $Dy1$ is, the smaller the error generated in the correction coefficient $Ry1/Dy1$ is.

On the other hand, the difference $Dy1$ varies in accordance with at least one of the position, of the reference position, in the Y-axis direction and the position, of the specific check box, in the Y-axis direction. The larger the separation distance, in the Y-axis direction, between the reference position and the specific check box is, the larger the difference $Dy1$ is.

Therefore, the larger the separation distance, in the Y-axis direction, between the reference position and the specific check box is, the smaller the proportion of one pixel to the difference $Dy1$ is, and the smaller the error generated in the correction coefficient $Ry1/Dy1$ is.

That is, the larger the separation distance, in the Y-axis direction, between the position specifying image and the specific check box is, the higher the accuracy of executing the correction is. Therefore, when the reference position is a position as far as possible from the specific check box of the position specifying image in the Y-axis direction, the correction can be executed with high accuracy. When the specific check box is the check box present at a position as far as possible from the reference position in the Y-axis direction, the correction can be executed with high accuracy. Therefore, when the reference position is a position farthest from the specific check box of the position specifying image and when the specific check box is the check box present at the position farthest from the reference position, the correction can be executed with the highest accuracy. The same applies to the correction in the X-axis direction.

In the image processing apparatus 1, the configuration has been described in which the control portion 25 is capable of executing both the code formation process and the written result detection process. However, the control portion 25 may be configured to be able to execute only one of the code formation process and the written result detection process.

[Second Embodiment]

Hereinafter, a second embodiment of the present disclosure will be described. It should be noted that in the present embodiment, a description will be omitted for components and process functions identical to those of the image processing apparatus 1 as described in the first embodiment.

Specifically, in the first embodiment, the case has been described where the position information shown by the position specifying image is information indicating the relative position with respect to the reference position of each of all check boxes. On the other hand, in the present embodiment, the position information of one preset specific check box of the check boxes is the relative position with respect to the print position of the position specifying image when the position specifying image is to be printed on the document by the print processing portion, for example, first relative information indicating the relative position with respect to the reference position. The position information of each of the other check boxes except the specific check box is second relative information indicating the relative position with respect to the adjacent check box.

The print processing portion 92 is capable of printing the position specifying image indicating the first relative information and the second relative information. The position specification processing portion 95 recognizes the first relative information and the second relative information from the position specifying image included in the read image read by the image reading portion 3. The position specification processing portion 95 specifies the position information of each of check boxes using the first relative information and the second relative information.

Also in the present embodiment, when the image processing apparatus 1 reads the document on which the position specifying image has been printed by another image processing apparatus, an error may occur, due to the difference in optical characteristic or the like, between the relative position information and the actual position information of each of check boxes with respect to the reference position in the read image. That is, when the image processing apparatus 1 reads the document on which the position specifying image has been printed by the other image processing apparatus, the image processing apparatus 1 may not be capable of accurately specifying the position of each of check boxes.

Thus, also in the present embodiment, as in the first embodiment, the control portion 25 (position specification processing portion 95) has a function to correct the relative position information in the written result detection process. Specifically, the control portion 25, as in the first embodiment, calculates the correction coefficient Ry1/Dy1. The control portion 25 corrects the second relative information using the correction coefficient Ry1/Dy1.

By executing the correction process, the image processing apparatus 1 is capable of accurately detecting the position of each of check boxes even if the document that is the reading target is a document on which the position specifying image has been printed by the other image processing apparatus.

In addition, as in the first embodiment, the larger the separation distance between the position specifying image and the specific check box is, the higher the accuracy of executing the correction is. Therefore, when the reference position is a position as far as possible from the specific check box of the position specifying image, the correction can be executed with high accuracy. That is, when the first relative information is the information indicating the relative position with respect to the reference position farthest from the specific check box in the position specifying image, the correction can be executed with the highest accuracy. When the specific check box is the check box present at a position as far as possible from the reference position, the correction can be executed with high accuracy. Therefore, when the reference position is a position farthest from the specific check box of the position specifying image and when the specific check box is the check box present at the position farthest from the reference position, the correction can be executed with the highest accuracy.

For example, in the case where check boxes are arranged in a matrix state at a regular interval, that is, in the case where the arrangement manner of the check boxes on the document has regularity, the data amount of the second relative information can be reduced. Specifically, the information regarding the regularity of the arrangement manner may be included in the position specifying image. Thus, the control portion 25 is capable of specifying, from the position specifying image, the position information of each of the check boxes on the basis of the information regarding the regularity of the arrangement manner.

In the first embodiment and the second embodiment, the relative position information of the check box is set with, as a reference position, one point on the position specifying image. However, three points on (three corner portions of) the position specifying image are set as reference positions, and the relative position information may be set in which the position of each of check boxes is represented by the distance from the reference position. In this case, since the number of positions having the distance determined from different three points is limited to one, it is possible to accurately detect the position of each of check boxes on the basis of the relative position information even if skew occurs in the document.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image processing apparatus comprising:
   an image reader configured to read an image of a document;
   a position detector configured to detect position information of each of check boxes included in a read image read by the image reader;

a print processor configured to be able to print the read image and a position specifying image indicating the position information of each of the check boxes detected by the position detector;

a controller configured to execute printout of a printed matter in which all check boxes have been checked or filled, on a basis of the position information detected by the position detector; and a determination processor configured to determine, when the position specifying image is to be superimposed and printed on the read image, whether or not a print target area on which the position specifying image is to be printed is blank, wherein when the determination processor determines that the print target area is not blank, the print processor prints a composite image of the position specifying image and a reduced image acquired by reducing the read image; and when the determination processor determines that the print target area is blank, the print processor sends a notification that the document should be set, and, when a print request is executed for the position specifying image, the print processor prints the position specifying image.

2. The image processing apparatus according to claim 1, wherein the position information is relative position information indicating a relative position between each of the check boxes and a print position of the position specifying image when the position specifying image is to be printed on the document by the print processor.

3. The image processing apparatus according to claim 2, wherein the relative position information is information indicating a relative position of each of the check boxes with respect to a reference position farthest from a check box in the position specifying image.

4. The image processing apparatus according to claim 1, wherein the position information of a preset specific check box of the check boxes is first relative information indicating a relative position with respect to a print position of the position specifying image when the position specifying image is to be printed on the document by the print processor, and the position information of each of the check boxes other than the specific check box is second relative information indicating a relative position with respect to an adjacent check box.

5. The image processing apparatus according to claim 4, wherein the first relative information is information indicating a relative position with respect to a reference position farthest from the specific check box in the position specifying image.

6. The image processing apparatus according to claim 4, wherein the specific check box is a check box farthest from the print position of the position specifying image.

7. The image processing apparatus according to claim 1, further comprising a notification processor configured to send a notification that the document should be set in a sheet feeder configured to supply a sheet to be printed by the print processor, wherein the print processor is configured to be able to print the position specifying image on the document to be set in the sheet feeder.

8. The image processing apparatus according to claim 1, wherein each of the check boxes is a rectangular or elliptical image, and the position specifying image is a one-dimensional barcode or a two-dimensional code.

9. The image processing apparatus according to claim 1, further comprising:

a position specification processor configured to specify the position information of each of the check boxes in the read image from the position specifying image included in the read image read by the image reader; and a written result acquisitioner configured to acquire a written result of each of the check boxes from the read image on the basis of the position information specified by the position specification processor.

10. The image processing apparatus according to claim 9, wherein the position specification processor is configured to detect a relative relationship between a preset specific check box of the check boxes and a print position of the position specifying image in the read image, correct the position information on a basis of the relative relationship, and specify the position information of each of the check boxes on a basis of the corrected position information.

* * * * *